May 28, 1957  G. HINRICHS  2,794,078

TROLLEY ARM FOR ELECTRICALLY DRIVEN VEHICLES

Filed May 10, 1951

INVENTOR:
Gerd Hinrichs
by

United States Patent Office 2,794,078
Patented May 28, 1957

2,794,078

TROLLEY ARM FOR ELECTRICALLY DRIVEN VEHICLES

Gerd Hinrichs, Heuchelheim, near Giessen, Germany, assignor to Schunk & Ebe G. m. b. H., Giessen, Germany Application May 10, 1951, Serial No. 225,476
In Germany February 14, 1949

Public Law 619, August 23, 1954
Patent expires February 14, 1969

13 Claims. (Cl. 191—59.1)

The present invention relates to a trolley pole for vehicles driven electrically by a current taken from an overhead wire, and more particularly to a trolley pole having a trolley comprising a sliding member in contact with the overhead wire.

Trolley poles of the type referred to are intended for use in connection with electrically driven vehicles running without tracks.

It is an object of the present invention to provide a trolley pole which can withstand the heavy strokes to which it is exposed by the overhead wire.

It is another object of the present invention to provide a trolley in which the sliding member is in a well defined position with respect to the supporting member.

It is a further object of the present invention to provide a trolley in which the sliding member is in permanent good electrical contact with the supporting member.

It is still another object of the present invention to provide a trolley which will not break under the load to which the same is subjected during operation.

It is still a further object of the present invention to increase the life of the sliding member and thereby to reduce the costs of maintenance.

It is still a further object of the present invention to provide a trolley which operates under hoarfrost conditions.

It is a still further object of the present invention to provide a trolley in which the sliding member can be easily exchanged without dismounting the second or holding member.

A trolley according to the present invention comprises in combination a first member having a shape tapering in the longitudinal direction thereof, a second member holding the first member in a substantially horizontal position and having a supporting face having a tapering shape fitting the tapering shape of the first member so as to make contact therewith, and means for pivotally supporting the second member, whereby the first member slides along the overhead wire and transfers the current from the same to the second member through the supporting face thereof.

Preferably the first member has a shape of a truncated cone or pyramid.

Preferably the means for pivotally supporting the second member are arranged substantially in or above the horizontal plane of symmetry of the first member.

A trolley pole according to the present invention comprises in addition a rod-shaped member having a forked end piece in which the second member is pivotally supported. Preferably the forked end piece is rotatably arranged on the rod-shaped member.

In a preferred embodiment of the present invention, the first member is provided with a longitudinal groove or recess forming a contact surface with the overhead wire and is arranged with the greatest cross-section thereof in the driving direction of the vehicle so that the first member slides along the overhead wire with the greatest cross-section thereof leading and the smallest cross-section thereof trailing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
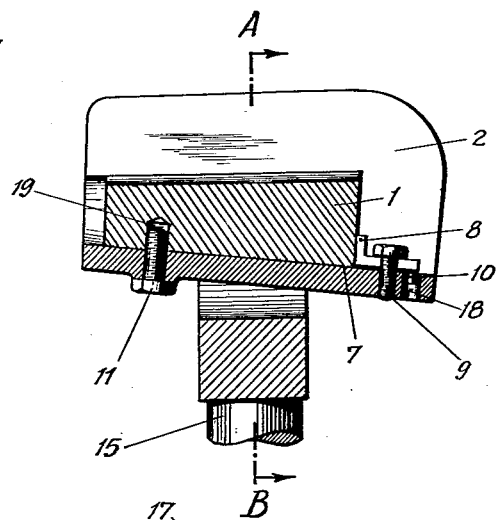
Fig. 1 is a longitudinal section through one embodiment of a trolley pole acocrding to the present invention.

Referring now to the drawings and first to Figures 1 and 2, a sliding member 1 (termed hereinafter the first member) is supported by a second or holding member 2 having two inclined parts 3 and 4 arranged oppositely to each other so as to leave a space between them including an upper portion 17 and a lower portion which accommodates the first member 1. The upper portion 17 is empty and serves for preventing the slipping off of the trolley from the overhead wire (not shown).

Figure 2:
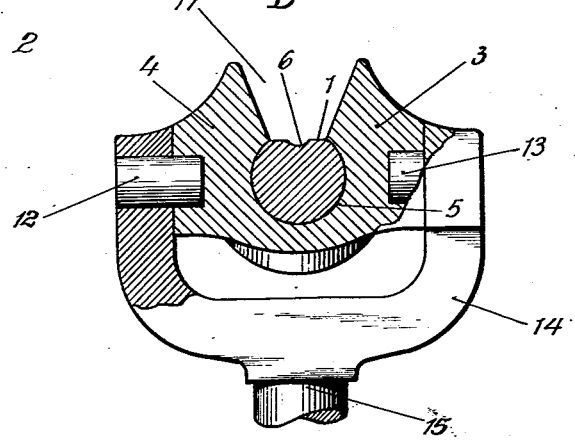
Fig. 2 is a cross-section along the line A—B of Fig. 1.

In the embodiment shown in Figures 1 and 2, the sliding member 1 has the shape of a truncated cone tapering in the longitudinal direction thereof. The second member 2 is provided with a supporting face 5 exactly fitting the surface of the sliding member 1 except the upper part thereof. In this way it is acocmplished that a large contact surface exists between the first and second members.

Preferably the upper side of the sliding member 1 is flattened and provided with a recess or groove 6 with which the overhead wire (not shown) is in sliding contact.

As will be seen from Figure 2, the inclined parts 3 and 4 are arranged above the recess or groove 6 of the sliding member 1 so that they prevent the overhead wire (not shown) from laterally slipping off from the sliding member 1.

The largest cross-section of the truncated sliding member 1 faces the driving direction of the vehicle which is represented in Figure 1 by the arrows. The larger end 7 of the sliding member 1 abuts against an angular member 8 which is secured to the second member 2 by means of a screw 9. In order to prevent a displacement of the angular member 8 with respect to the second member 2, a pin-shaped extension 10 of the angular member 8 engages a corresponding aperture 18 of the second member 2. In order to prevent a rotation of the sliding member 1 with respect to the second or holding member 2, a screw 11 is inserted in a threaded boring in the bottom of the second member 2 and projects into a circular recess 19 provided in the bottom part of the sliding member 1.

The second or holding member 2 is pivoted to the forked end piece 14 of a rod-shaped member 15 by means of two oppositely arranged pivots 12 and 13. The forked end piece 14 is preferably rotatable with respect to the rod-shaped member 15. The common axis of the pivots 12 and 13 is arranged substantially in or above the horizontal plane of symmetry of the first member 1 so that no tilting moment is exerted on the sliding member 1 when the overhead wire (not shown) comes into contact with the sliding member 1. In consequence thereof, the overhead wire comes into contact with the whole length of the recess or groove 6 so that a uniform transfer of current from the overhead wire to the sliding member 1 is secured.

Figure 3:
Fig. 3 is a perspective view of a sliding member according to a second embodiment of the present invention.

Referring now to Figure 3, the sliding member 16 has the shape of a truncated pyramid provided on the upper surface thereof with a groove or recess 6. The supporting face of the second member is in this case correspondingly shaped as a truncated pyramid. In all other respects, the second member is designed as in the embodiment shown in Figures 1 and 2.

It will be understood that each of the elements described above, or two or more together, may also find a useful application in other types of trolley poles for electrically driven vehicles differing from the types described above.

While I have illustrated and described the invention as embodied in a trolley pole having a trolley comprising a sliding member in contact with the overhead wire, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A trolley for vehicles driven electrically by a current taken from an overhead wire comprising in combination, an elongated first member having a leading end and a trailing end and adapted to make contact in the longitudinal direction thereof with the overhead wire, said first member tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means for pivotally supporting said second member, whereby said first member slides in the longitudinal direction thereof along the overhead wire so as to be held in contact making position with said supporting face of said second member by the fit of the tapering shapes of said first and second members.

2. A trolley for vehicles driven electrically by a current taken from an overhead wire comprising in combination, an elongated first member having a leading end and a trailing end and adapted to make contact in the longitudinal direction thereof with the overhead wire, said first member having a shape of a truncated cone tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means for pivotally supporting said second member, whereby said first member slides in the longitudinal direction thereof along the overhead wire so as to be held in contact making position with said supporting face of said second member by the fit of the tapering shapes of said first and second members.

3. A trolly for vehicles driven electrically by a current taken from an overhead wire comprising in combination, an elongated first member having a leading end and a trailing end and adapted to make contact in the longitudinal direction thereof with the overhead wire, said first member having a shape of a truncated pyramid tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means for pivotally supporting said second member, whereby said first member slides in the longitudinal direction thereof along the overhead wire so as to be held in contact making position with said supporting face of said second member by the fit of the tapering shapes of said first and second members.

4. A trolley for vehicles driven electrically by a current taken from an overhead wire comprising in combination, an elongated first member having a leading end and a trailing end and adapted to make contact in the longitudinal direction thereof with the overhead wire, said first member tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means arranged substantially in the horizontal plane passing through the longitudinal axis of said first member for pivotally supporting said second member, whereby said first member slides in the longitudinal direction thereof along the overhead wire so as to be held in contact making position with said supporting face of said second member by the fit of the tapering shapes of said first and second members.

5. A trolley for vehicles driven electrically by a current taken from an overhead wire comprising in combination, an elongated first member having a leading end and a trailing end and adapted to make contact in the longitudinal direction thereof with the overhead wire, said first member tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means arranged above the horizontal plane passing through the longitudinal axis of said first member for pivotally supporting said second member, whereby said first member slides in the longitudinal direction thereof along the overhead wire so as to be held in contact making position with said supporting face of said second member by the fit of the tapering shapes of said first and second members.

6. A trolley arm for vehicles driven electrically by a current taken from an overhead wire comprising in combination, an elongated first member having a leading end and a trailing end and adapted to make contact in the longitudinal direction thereof with the overhead wire, said first member tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; a rod-shaped member having a forked end piece; and means for pivotally supporting said second member in said forked end piece of said rod-shaped member, whereby said first member slides in the longitudinal direction thereof along the overhead wire so as to be held in contact making position with said supporting face of said second member by the fit of the tapering shapes of said first and second members.

7. A trolley arm for vehicles driven electrically by a current taken from an overhead wire comprising in combination, an elongated first member having a leading end and a trailing end and adapted to make contact in the longitudinal direction thereof with the overhead wire, said first member tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; a rod-shaped member having a forked end piece rotatably arranged on said rod-shaped member; and means for pivotally supporting said second member in said forked end piece of said rod-shaped member, whereby said first member slides in the longitudinal direction thereof along the overhead wire so as to be held in contact making position with said supporting face of said second member by the fit of the tapering shapes of said first and second members.

8. A trolley for vehicles driven electrically by a current taken from an overhead wire comprising in combination, an elongated first member having a leading end and a trailing end and tapering uniformly from end to end and decreasing in cross-section from its leading to its trailing end said first member being provided with a longitudinal recess forming a contact surface for contacting the overhead wire; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means for pivotally supporting said second member, said first member being adapted to be arranged with the end thereof having the larger cross-section facing the driving direction of the vehicle, whereby said first member slides in the longitudinal direction thereof along the overhead wire with the larger end thereof leading and the smaller end thereof trailing so as to be held in contact making position with said supporting face of said second member by the fit of the tapering shapes of said first and second members.

9. A trolley arm for vehicles driven electrically by a current taken from an overhead wire comprising in combination, an elongated first member adapted to make contact in the longitudinal direction thereof with the overhead wire, said first member having a leading end and a trailing end and tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging contact with said first member and so that in the movement of said first member relative to and in contact with the overhead wire in the direction in which said leading end thereof faces, said first member is urged into wedging engagement with said supporting face of said second member; a rod-shaped member having a forked end piece rotatably arranged on said rod-shaped member; and means arranged above the horizontal plane passing through the longitudinal axis of said first member for pivotally supporting said second member in said forked end piece of said rod-shaped member, whereby said first member slides in the longitudinal direction thereof along the overhead wire so as to be held in contact making position with said supporting face of said second member by the fit of the tapering shapes of said first and second members.

10. A trolley for vehicles driven electrically by a current taken from an overhead wire, comprising, in combination, an elongated first member having a leading end and a trailing end and adapted to make contact in the longitudinal direction thereof with the overhead wire, said first member tapering uniformly from end to end and decreasing in cross section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; means for limiting in one direction the movement of said first member with respect to said second member; and means for pivotally supporting said second member, whereby said first member slides in the longitudinal direction thereof along the overhead wire so as to be held in contact making position with said supporting face of said second member by the fit of the tapering shapes of said first and second members.

11. A trolley arm for vehicles driven electrically by a current taken from an overhead wire, comprising, in combination, an elongated first member having a leading end and a trailing end and adapted to make contact in the longitudinal direction thereof with the overhead wire, said first member tapering uniformly from end to end and decreasing in cross section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; a rod-shaped member having a forked end piece rotatably arranged on said rod-shaped member; and means arranged substantially in the horizontal plane passing through the longitudinal axis of said first member for pivotally supporting said second member in said forked end piece of said rod-shaped member, whereby said first member slides in the longitudinal direction thereof along the overhead wire so as to be held in contact making position with said supporting face of said second member by the fit of the tapering shapes of said first and second members.

12. A trolley for vehicles driven electrically by a current taken from an overhead wire comprising in combination, an elongated first member having a leading end and a trailing end and adapted to make contact in the longitudinal direction thereof with the overhead wire, said first member tapering uniformly from end to end and decreasing in cross-section from its leading to its trailing end; an elongated second member holding said first member in a substantially horizontal position and having a supporting face, said second member having a tapering shape fitting the tapering shape of said first member so that said supporting face makes wedging engagement with said first member and so that in the movement of said first member relative to and in contact with the overhead wire in the direction in which said leading end thereof faces, said first member is urged into wedging engagement with said supporting face of said second member; and means for supporting said second member, whereby said first member slides in the longitudinal direction thereof along the overhead wire so as to be held in contact making position with said supporting face of said second member by the fit of the tapering shapes of said first and second members.

13. An insert for use in a current collector holder having a longitudinally tapered insert cavity comprising an elongated block of current conducting material of partial circular cross section and tapered longitudinally for mating coaction with the holder cavity, the insert having a recessed portion extending longitudinally thereof and adapted for engagement with a current conducting wire.

References Cited in the file of this patent

UNITED STATES PATENTS

| | | |
|---|---|---|
| 1,491,403 | Hough et al. | Apr. 22, 1924 |
| 1,542,572 | O'Neal | June 16, 1925 |
| 1,604,162 | Henry et al. | Oct. 26, 1926 |
| 1,843,501 | Baldwin | Feb. 2, 1932 |
| 1,951,459 | Wilkins | Mar. 20, 1934 |
| 2,185,257 | Larsson | Jan. 2, 1940 |
| 2,185,269 | Ryan | Jan. 2, 1940 |
| 2,342,296 | Palmer | Feb. 22, 1944 |
| 2,416,883 | Selquist | Mar. 4, 1947 |
| 2,691,701 | Larsson | Oct. 12, 1954 |

FOREIGN PATENTS

| | | |
|---|---|---|
| 559,129 | Great Britain | Feb. 4, 1944 |